Oct. 12, 1965        J. L. CANTRELL        3,210,990
DROPPED INFLATABLE PENETROMETER
Filed May 27, 1963
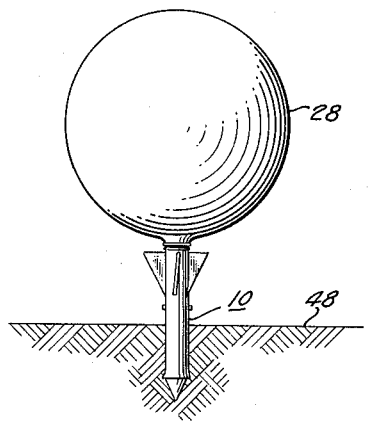
Fig. 3
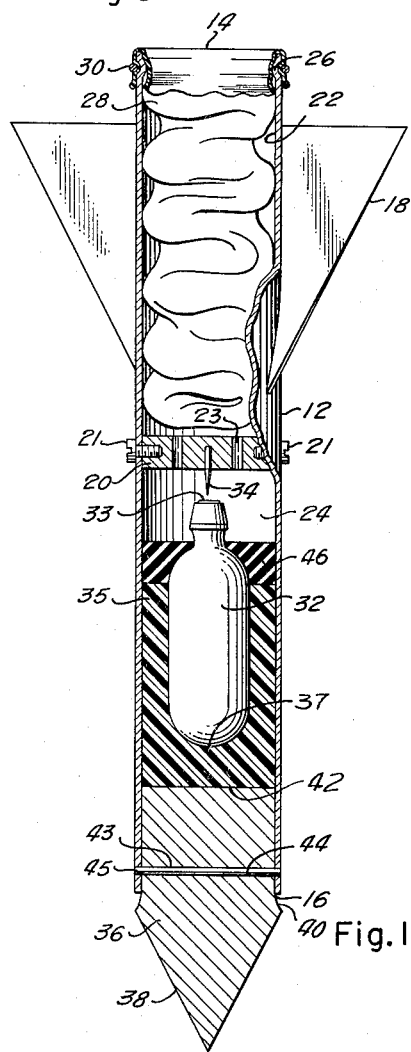
Fig. 2
Fig. 1
INVENTOR
John L. Cantrell
BY
ATTORNEY

United States Patent Office 3,210,990
Patented Oct. 12, 1965

3,210,990
DROPPED INFLATABLE PENETROMETER
John L. Cantrell, Dallas, Tex., assignor to Texas Instruments Incorporated, Dallas, Tex., a corporation of Delaware
Filed May 27, 1963, Ser. No. 283,243
4 Claims. (Cl. 73—84)

The present invention relates to penetrometers for determining the trafficability of terrain and more particularly to a dropped penetrometer which utilizes an inflatable member for indicating the presence of a surface having predetermined minimum trafficability.

It is often times desirable to determine the trafficability or hardness of terrain to be traversed by men and equipment. For example, it is of critical importance in military operations that routes be chosen, to the extent possible, which will permit movement of vehicles and men in the most expeditious manner. In rescue operations, it may be necessary to land helicopters in marshy areas. Some indication of the trafficability of the surface must be obtained if there is to be any assurance that the helicopter will be able to resume flight after landing. The above are merely exemplary of the many situations which arise and create a need to determine the trafficability or hardness of terrain.

Heretofore, manual penetrometers have most commonly been used for determining the trafficability or hardness of terrain. Such manual penetrometers usually consist essentially of a probing element which is manually or mechanically driven into the ground. The force or pressure required for penetration is indicated in some manner, permitting the operator to determine the trafficability of the terrain. The above manual method has several disadvantages, however. It the terrain is not directly accessible, obviously a manual penetrometer cannot be utilized. In addition, if combat conditions exist, the operation is extremely hazardous in that the personnel making the ground survey are exposed to enemy fire.

In an effort to obviate the above difficulties encountered using the manual penetrometer, several types of dropped penetrometers have been proposed. However, in general, they have not been entirely suitable in that either their cost precluded widespread use or else they were difficult to detect for one reason or another.

In accordance with the present invention, an improved dropped penetrometer is provided which is of simple construction and inexpensive to manufacture. In addition, several different means can be used for detecting the indication that terrain is of adequate hardness or trafficability.

In accordance with the principles of the present invention, a tubular casing which carries an inflatable member, a source of compressed gas, and a nose cone telescopically associated with the casing are provided. The nose cone is physically connected to the casing by a shear pin of predetermined characted. It the trafficability of the terrain on which the penetrometer is dropped is sufficient for the desired use, the impact generated when the nose cone strikes the terrain will be sufficient to shear the pin, causing the gas to be released and fill the inflatable member. The inflatable member is preferably formed of metalized Mylar, permitting the condition of the penetrometer to be detected visually, photographically or by radar or infrared means.

Many objects and advantages of the invention will become apparent to those skilled in the art as the following detailed description of the same unfolds when taken in conjunction with the appended drawing wherein like reference numerals denotes like parts and in which:

FIGURE 1 is a side elevation view, partially in cross section, illustrating the arrangement of parts comprising the present invention prior to striking terrain of desired trafficability;

FIGURE 2 is a cut away view, partially in cross section, similar to FIGURE 1, but illustrating the device provided by the present invention subsequent to impact with terrain of at least minimum trafficability; and FIGURE 3 is a side elevation view illustrating the display provided by the apparatus of the present invention upon impact with terrain of at least minimum trafficability.

Turning now to the drawings, the device 10 provided by the present invention is seen to include a tubular casing 12 of circular transverse section which is open at the ends 14 and 16. The casing 12 is preferably sufficiently long with respect to its diameter to provide the desired aerodynamic stability.

A plurality of fins 18 attached to the casing 12 near the end 14 can be provided for stabilizing the path of the device 10 as it falls through the air. The fins 18 are suitably canted as shown in order to obtain spin stabilization. In addition to providing better control over the path of the device, the fins permit the device to attain its terminal velocity within a shorter period of time, enabling the device to be dropped from lower altitudes, and also reduce the treminal velocity of the device. Many other types of streamers and tail fins known in the art may be used.

A web 20 which is suitably secured to the casing 12 by set screws 21 divides the casing 12 into compartments 22 and 24. Openings 23 in the web 20 provide communication between the compartments as shown.

A circumferential grove 26 extends around the outer surface of casing 12 near the end 14. The end 14 of the casing extends into the throat of an inflatable member 28 past the groove 26. Lock ring 30 encircles the throat of the member 28 and cooperates with the groove 26 to hold the member 28 to the casing 12 in sealed relationship. The inflatable member 28 is everted and stored in the compartment 22 as shown in FIGURE 1.

A container 32 of gas, such as carbondioxide, is positioned in the compartment 24 as shown. Container 32 includes a rupturable seal 33 which is suitably opened by a spike 34 mounted on the web 20. The configuration of the spike 34 can vary, dependent upon the gas pressure and type of seal 33. Thus, a round, smooth spike may close the opening produced as it is driven into the seal 33, rendering it desirable to provide teeth for tearing the seal on the spike 34 or other means for reliably releasing the gas from container 32. If the outside diameter of the container 32 is substantially less than the inside diameter of casing 12, sleeve 35, having a re-entrant opening 37 in which the cylinder 32 fits, may be provided. The sleeve 35 insures that the seal 33 of container 32 will be aligned with the spike 34.

The base end of the sleeve 35 abuts the end of a nose cone 36 at 42. As shown, nose cone 36 is of generally cylindrical configuration and telescopically associated with the casing 12. The nose cone 36 is suitably flared outwardly at 40 to a diameter larger than that of casing 12, and terminates in a conically shaped end portion 38. A shear pin 44 extends through the hole 43 formed in the nose cone 36 and holds 45 in the casing 12 for releasably connecting the nose cone 36 to casing 12.

Prior to use, the arrangement of the device will be as shown in FIGURE 1. Thus, the inflatable member 28 is everted and positioned within the compartment 22 and the nose cone 36 is releasably connected to the walls of the casing 12 by the shear pin 44. Although the sleeve 35 which carries the container 32 may move axially within the casing 12, there is virtually no possibility of the container 32 moving against the spike 34 with sufficient force to rupture the seal 33. It will also be appreciated that the length of the device 10 may be great as compared to its diameter. In such instance, the web 20 will be positioned only far enough from the end 16 to provide compartment 22 with sufficient size to store the inflatable member 28. Also, the sleeve 35 is suitably sufficiently long to position the seal 33 closely adjacent to the spike 34. If desired, a push rod (not shown) may be provided between the sleeve 35 and the nose cone 36.

In use, a cluster of the devices 10 is dropped from an airplane or other platform at a height sufficient to insure that the terminal velocity of the devices will be attained prior to the impact with the terrain. It is preferred that the devices be dropped in clusters in order that the observer can distinguish situations wherein one or more of the devices are actuated by randomly spaced hard spots or objects. The shear pin 44 is selected to be of a size and material such that if the trafficability of the terrain on which the device 10 falls is less than desired, the device 10 will penetrate the terrain without sufficient impact to shear the pin 44 and the condition of the device 10 will not change from that which existed when it was dropped. However, if the terrain is trafficable, the impact level produced when the nose cone 38 strikes the terrain will be sufficient to shear the pin 44, permitting the nose cone 36 to be driven upwardly into the casing until the spike 34 ruptures the seal 33, as shown in FIGURE 2. It will be noted that the impact produced when the device strikes is a function of the speed of the device, its mass, and the hardness of the ground. As the terminal velocity of the device can be calculated, its mass can be measured and the requisite terrain hardness is known, the critical impact level can be determined and a shear pin of appropriate size and material chosen. However, it is essential that the device be dropped from a height sufficient to insure that the terminal velocity of the device is attained prior to impact with the ground.

When the seal 33 is ruptured, the gas will be released, causing the inflatable member 28 to be ejected from the compartment 22 and filled wtih gas, as shown in FIGURE 3. A suitable sealant 46, such as uncured latex, may be provided about the neck of the container 32 to retard or prevent the escape of gas through the end 16 of the casing 12. In addition, as the nose cone 36 is telescopically driven into the casing 12, the outwardly flared portion 40 engages the wall of the casing as shown, further sealing against the loss of gas.

The casing 12 can be of any suitable material, as, for example, aluminum or steel. It is preferred that the nose cone 36 be of a relatively hard material such as bronze or steel to prevent undue deformation as the device 10 penetrates the terrain. The inflatable member 28 can also be of many different materials. However, the preferred material for forming the inflatable member 28 is metalized Mylar or a material having similar characteristics. Metalized Mylar is the preferred material as it is of a character which reflects electromagnetic waves and can be detected by radar means. The metalized Mylar is readily available, and can be of any desired color to facilitate detection by visual or photographic means. If metalized Mylar is used, it is desirable that the amount of gas contained within the container 32 only be sufficient to eject the member 28 from the compartment 22 and provide a small positive pressure. As the metalized Mylar is pre-stretched, it is not necessary that a substantial gas pressure be maintained for stretching the member 28. The use of low positive gas pressure in the device reduces the leakage of gas from the device once it has been actuated. As the ultimate pressure within the inflatable member is low, considerable cooling of the gas occurs as it expands upon release from the container 32. The temperature anomaly between the inflatable member and the ambient usually present will be sufficient to permit detection by infrared sensors. The diverse means available for detection, all of which are passive, greatly increases the utility of the device.

From the above, it is seen that the present invention provides an improved dropped inflatable penetrometer which is of simple construction and inexpensive to manufacture, thereby rendering it practical to utilize the device on a wide scale. In addition, the metalized Mylar inflatable member which is inflated to indicate the presence of trafficable terrain can be detected under very adverse conditions. Thus, the presence of the metalized Mylar inflatable members can be detected by infrared means or radar at night or under very adverse weather conditions, further extending the usefulness of the device.

Although the invention has been described with reference to a particular preferred embodiment, many modifications will be apparent to those skilled in the art in light of this disclosure and the invention should not be limited except as necessitated by the scope of the appended claims.

What I claim is:

1. A radar detectable dropped inflatable penetrometer for determining the trafficability of terrain that comprises:
    (A) A tubular casing of circular transverse section;
    (B) A nose cone of circular transverse section telescopically receivable in one end of said casing;
    (C) A shear pin passing through said nose cone and said tubular casing and normally maintaining said nose cone and said casing in fixed predetermined relation;
    (D) A circumferential groove extending about said casing near the end of said casing opposite said nose cone;
    (E) An inflatable member of metalized Mylar having an open throat into which the end of said casing extends past said circumferential groove;
    (F) A lock ring encircling the throat of said inflatable member and said casing and engaging said groove to connect said casing to said inflatable member in sealed relation;
    (G) Said inflatable member normally being everted and stored within said casing;
    (H) A container of compressed gas carried within said casing; and
    (I) Means for releasing the gas in said container to eject said inflatable member from said casing and inflate same responsive to movement of said nose cone into said casing upon said nose cone striking terrain of a hardness to generate an impact sufficient to shear said shear pin.

2. A dropped inflatable penetrometer for determining the trafficability of terrain and that comprises:
    (A) A tubular casing of circular transverse section;
    (B) A web member positioned to divide the casing into two open ended compartments;
    (C) At least one opening in the web member for providing communication between said two compartments;
    (D) An inflatable member having an opening;
    (E) A groove formed in the surface of said casing adjacent one end of said casing;
    (F) Said one end extending into the opening of said inflatable member past said groove;
    (G) A lock ring engaging said groove to hold said inflatable member to said casing in sealed relationship;
    (H) Said inflatable member normally being everted and carried in one of said compartments;
    (I) A container of compressed gas having a rupturable seal positioned in the other of said compartments;
    (J) A spike carried by said web member and projecting into said other compartment;

(K) Said spike and said container being aligned for said spike to rupture said seal responsive to movement of said container toward said spike;

(L) A nose cone of circular transverse section telescopically receivable in said casing;

(M) Said nose cone being shaped to define a generally cylindrical body portion and a conical end portion extending from said casing; and (N) A shear pin for maintaining said nose cone in fixed extended relation to said casing;

(O) Said shear pin being adapted to be sheared responsive to an impact of greater than a predetermined level against said nose cone whereby said nose cone moves into said casing to drive said container against said spike to release gas from said container and expel the inflatable member from the chamber and inflate same, thereby providing an indication that the terrain is trafficable.

3. A dropped inflatable penetrometer as defined in claim 2 wherein said inflatable member is formed of prestretched metalized Mylar and said container contains a metered amount of gas sufficient to fill said casing and said inflatable member without substantial residual pressure.

4. A dropped inflatable penetrometer as defined in claim 2 wherein said nose cone includes an outwardly flared portion of greater diameter than said casing, whereby said flared portion engages and deforms said casing as said nose cone is driven into said casing to thereby seal said other end of said casing to reduce leakage of gas.

References Cited by the Examiner
UNITED STATES PATENTS

| | | | |
|---|---|---|---|
| 2,796,760 | 6/57 | Warlam | 73—82 |
| 2,825,803 | 3/58 | Newbrough | 9—9 X |
| 3,035,285 | 5/62 | Squires | 116—124 X |
| 3,071,787 | 1/63 | Burker | 9—8 |

FOREIGN PATENTS 341,512   10/21   Germany.

RICHARD C. QUEISSER, *Primary Examiner.*